N. L. WEST.
LOCK WASHER AND NUT.
APPLICATION FILED JULY 2, 1920.
1,371,134.
Patented Mar. 8, 1921.
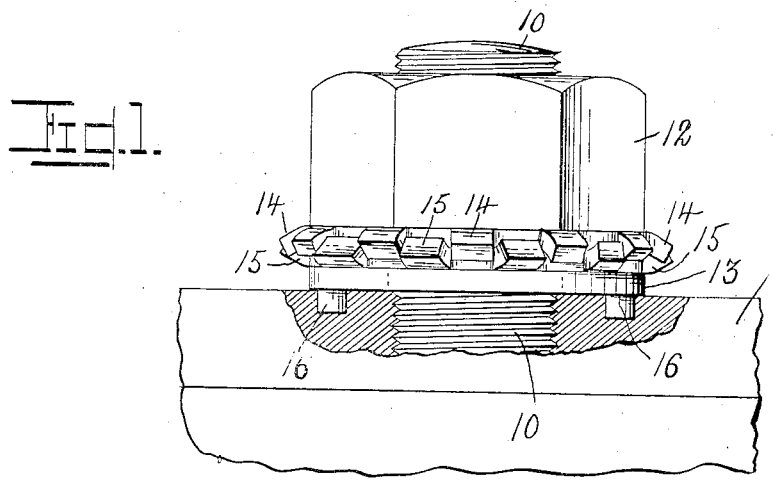
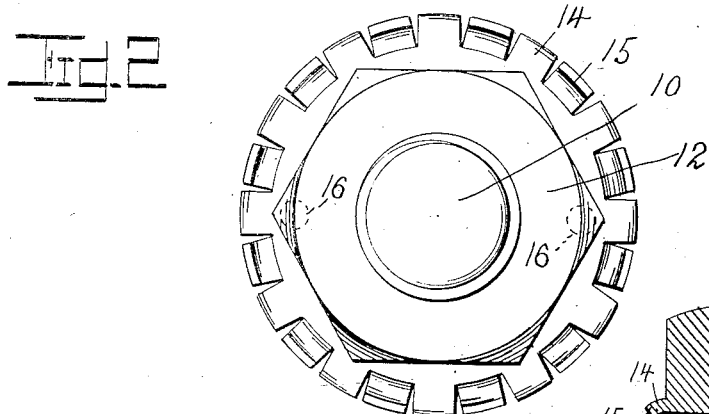
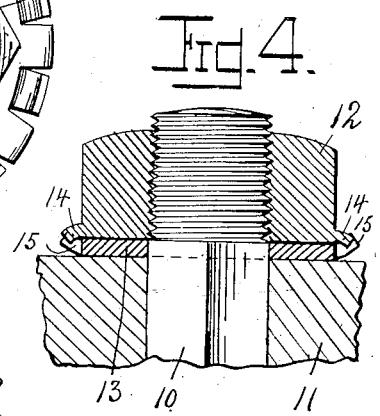
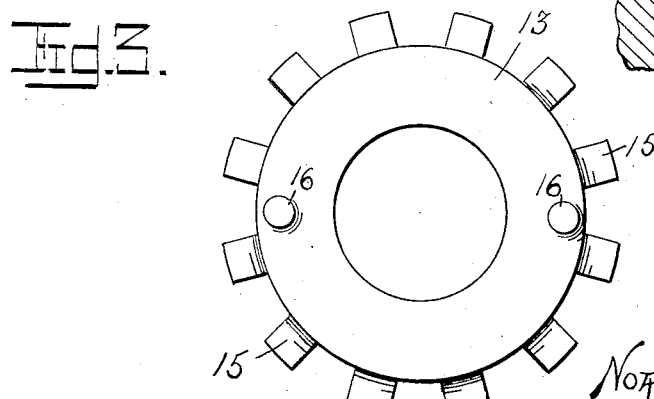
Inventor
Norman L. West,
By Geo. P. Kimmel
Attorney

UNITED STATES PATENT OFFICE.

NORMAN L. WEST, OF COLUMBIANA, ALABAMA.

LOCK WASHER AND NUT.

1,371,134.

Specification of Letters Patent.   Patented Mar. 8, 1921.

Application filed July 2, 1920.  Serial No. 393,656.

*To all whom it may concern:*

Be it known that I, NORMAN L. WEST, a citizen of the United States, residing at Columbiana, in the county of Shelby and State of Alabama, have invented certain new and useful Improvements in Lock Washers and Nuts, of which the following is a specification.

This invention relates to lock nuts, and has for one of its objects to improve the construction and increase the efficiency of devices of this character.

With these and other objects in view, the invention consists in certain novel features of construction as hereinafter shown and described and then specifically pointed out in the claims, and in the drawings illustrative of the preferred embodiment of the invention.

Figure 1 is a side elevation with the engaged body partly in section.

Fig. 2 is a plan view.

Fig. 3 is a bottom plan view of the washer part of the improved device.

Fig. 4 is a sectional detail illustrating a modification in the construction.

The improved device includes a bolt 10, adapted to pass through a body represented at 11, and nut 12 engaging the bolt, and a washer 13 between the nut 12 and the body 11.

The nut 12 is provided with a plurality of radially projecting spaced lugs 14 extending from its lower edge, while the washer 13 is provided with a plurality of similar lugs 15 extending radially from its outer edge. Projecting from the lower face of the washer 13 are studs 16 to enter the body 11 and prevent the rotation of the washer thereon. The lugs 14 of the nut come opposite the spaces between the lug 15 of the washer, so that after the nut is turned "home" by a wrench or other implement, and the studs 16 pressed into the body, the lugs will be bent to interlock, as shown in Figs. 1 and 2, and coact with the studs 16 to effectually lock the nut to the substructure 11 and prevent retrograde or loosening movement thereof.

Any required number of the lugs 14 and 15 may be employed but by employing a relatively large number of the lugs, the nut can be locked after a correspondingly short part of a movement upon the bolt, as will be obvious.

The preferred embodiment of the invention is disclosed in the drawings and set forth in the specification, but it will be understood that any modifications within the scope of the claim may be made in the construction without departing from the principle of the invention or sacrificing any of its advantages.

When the device is employed upon a bolt having a square or otherwise than round portion, the washer 13 may be formed without the lugs 16, as shown in Fig. 4, with the aperture therein conforming to the portion of the bolt which is other form than round, so that the washer is held from turning.

What I claim is:

In a device of the class described including a bolt and nut, said nut having laterally directed bendable lugs, a washer having means to hold it from rotation and provided with radial bendable lugs, the lugs of the nut and the lugs of the washer interlocking when bent obliquely to the planes of the nut and washer.

In testimony whereof, I affix my signature hereto.

NORMAN L. WEST.